Jan. 24, 1956  I. GEBEL  2,732,445
FILL CONTROL UNIT FOR AUTOMATIC WASHING MACHINES
Filed Jan. 13, 1954  2 Sheets-Sheet 1

Irving Gebel

Jan. 24, 1956          I. GEBEL          2,732,445
FILL CONTROL UNIT FOR AUTOMATIC WASHING MACHINES
Filed Jan. 13, 1954          2 Sheets-Sheet 2
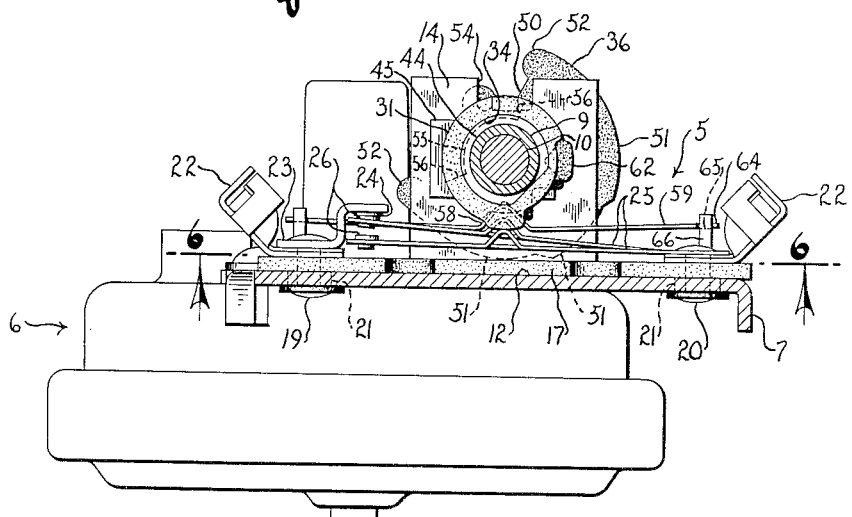
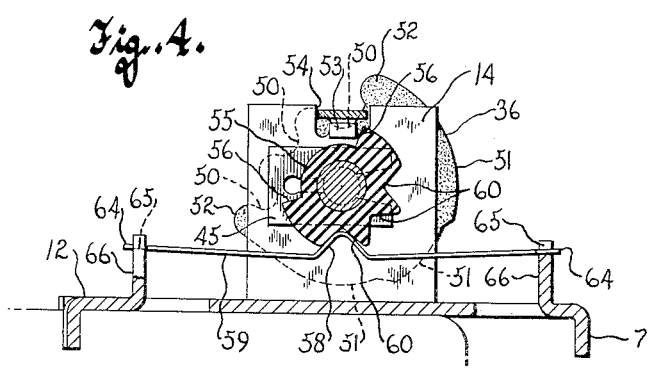
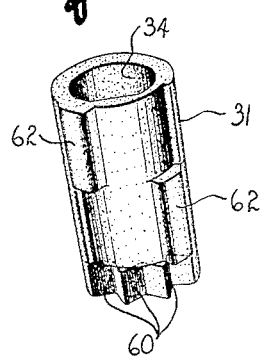
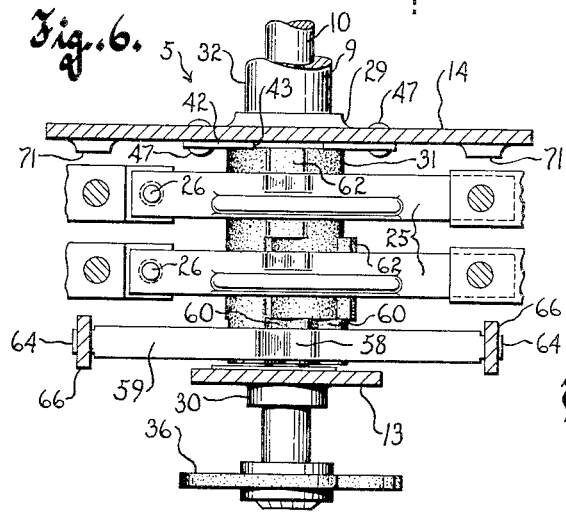
Irving Gebel

United States Patent Office 2,732,445
Patented Jan. 24, 1956

2,732,445

FILL CONTROL UNIT FOR AUTOMATIC WASHING MACHINES

Irving Gebel, Oak Park, Ill., assignor to Soreng Products Corporation, Schiller Park, Ill., a corporation of Illinois Application January 13, 1954, Serial No. 403,755

8 Claims. (Cl. 200—18)

This invention relates to electrical control devices for washing machines and the like and has more particular reference to fill control instrumentalities for selecting and predetermining the level and temperature of water used to fill the washing machine.

In most automatic washing machines presently in use the machine is filled with water through two water lines, one connecting with a source of hot water and the other with a source of cold water. An electromagnetic valve in each of these water supply lines must be opened to admit water into the machine, and it is customary to provide a temperature control switch instrumentality to enable selection of the desired temperature of the water used to fill the machine.

Thus, for instance, if it is desired to fill the machine with hot water the temperature selecting switch is manually set to allow energization of only the electromagnetic valve in the hot water line and the machine will fill with hot water to a level determined either by a float or a pressure sensitive water level control device embodying a switch controlling energization of both valves. The level control switch, of course, is opened automatically at the time the desired water level is reached to effect de-energization of the electromagnetic valve in the hot water line. A similar procedure is followed when it is desired to fill the machine with cold water, it being understood that the temperature selecting switch is set to effect energization (opening) of only the electromagnetic valve in the cold water line. If it is desired to fill the machine with warm water, the temperature selecting switch is manually set to effect simultaneous energization (opening) of both electromagnetic valves to allow hot and cold water together to enter the machine.

In washing machines of the type here under consideration it is also desirable to provide for automatic filling of the machine to any one of a number of different levels, so that a saving of hot water can be effected when it is desired to wash smaller than average loads of clothes. This feature has been realized in the past by provision of a manually adjustable stationary contact for the level control switch, allowing presetting of the stationary contact of the switch to one or more positions representing different water levels for the machine.

Heretofore the water level and temperature selecting instrumentalities have been separate units sometimes mounted on different parts of the washing machine and each having its own operating shaft to enable manual selection of the temperature and the level of the water used to fill the machine.

It is the primary purpose of this invention to provide a fill control unit comprising primarily a rotary water temperature controlling and selecting switch, and a single inexpensive mounting bracket providing for the attachment of both the water temperature and level control devices on a panel of the washing machine.

More particularly this invention has as its purpose the provision of a fill control unit of the character described having a pair of coaxial telescoped operating shafts, one of which controls the water temperature selecting switch and the other of which provides for adjustment of the stationary contact of a pressure sensitive type water level selecting instrumentality which may be attached to the mounting bracket of the control unit to form a part thereof.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 3 is a cross sectional view taken through Figure 1 along the plane of line 3—3;

Figure 4 is a cross sectional view taken through Figure 2 along the plane of line 4—4;

Figure 5 is a perspective view of the rotor of the temperature selecting switch; and Figure 6 is a sectional view taken through Figure 3 along the plane of line 6—6.

Figure 1:
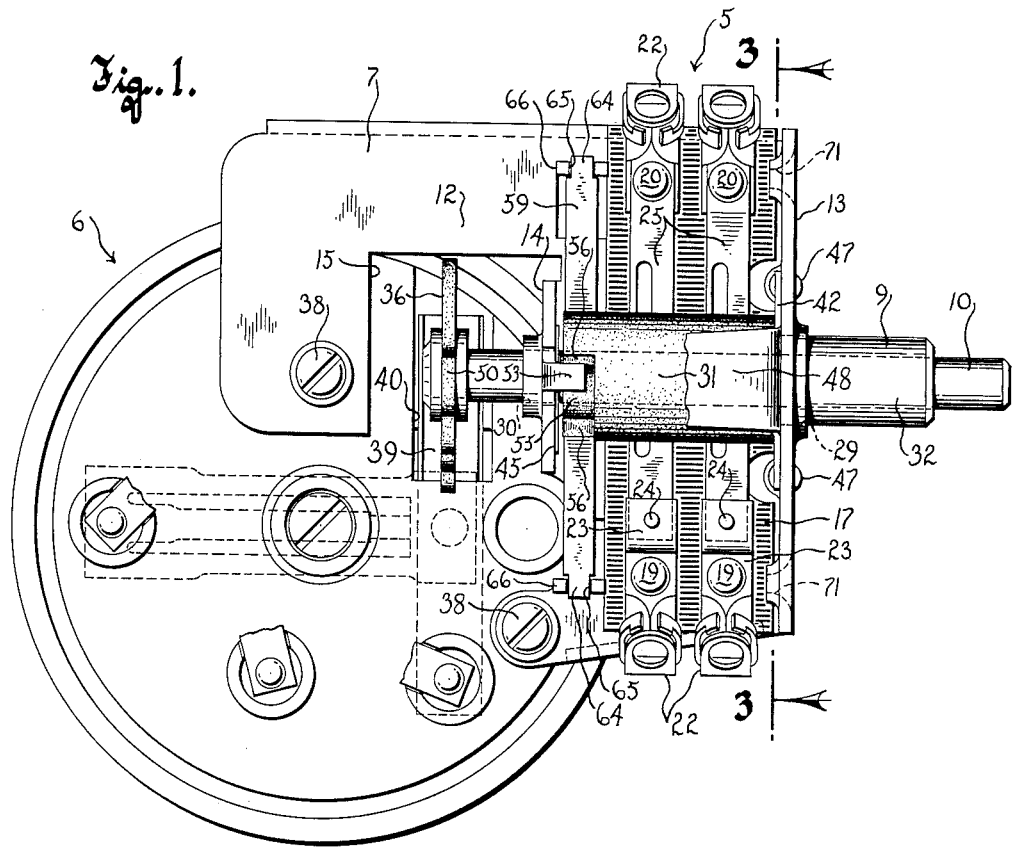
Figure 1 is a plan view of the fill control unit of this invention.

Referring now particularly to the accompanying drawings, the numerals 5 and 6 designate respectively the temperature and water level control instrumentalities for predetermining and selecting both the temperature and level of the water used to fill the washing receptacle of an automatic washing machine. These instrumentalities are adapted to be attached to a panel of a washing machine, and a feature of the present invention resides in the fact that a common inexpensive mounting bracket 7 is provided for this purpose.

As will appear in greater detail hereinafter, another feature of this invention is that the selection of water temperatures and levels is simplified through the provision of operating shafts for each of the instrumentalities, which shafts are telescoped, one inside the other. The outer shaft 9 controls the switching necessary to select the desired temperature of the water for the machine, while the inner shaft 10 provides for adjustment of the stationary contact of the switch incorporated in the water level selecting instrumentality 6, here shown as of the pressure sensitive type similar to that forming the subject of the copending application of Edgar M. Soreng and Irving Gebel, Serial No. 298,873, filed July 14, 1952.

The mounting bracket is an inexpensive sheet metal stamping having a relatively flat base 12 and upright spaced apart front and rear flanges 13 and 14, respectively, at the front portion of the bracket. The flange 13 is bent up from the front end of the base, while the rear flange 14 is struck upwardly from the intermediate portion of the base to be opposite and parallel to the front flange 13, and leaving an aperture 15 in the base intermediate its front and rear ends for a purpose to be described later.

The front portion of the mounting bracket is, therefore, substantially channel-shaped in cross section, and the space between the channel flanges accommodates the temperature selecting switch device 5. This switch comprises an elongated relatively flat insulating terminal head extending transversely across the base 12 between the flanges 13 and 14, and lying flatwise upon the upper face of the base. Preferably, the insulating terminal head and the mounting bracket form a subassembly, the head being secured to the base 12 of the bracket by pairs of rivets 19 and 20 passing through the opposite ends of the terminal head and insulated from the base by bushings 21 of insulating material. Each of these rivets also secures a female electrical connector 22 to the top side of the insulating terminal head. In addition, the rivets 19 at one end of the terminal head fixedly attach to the terminal head a pair of offset metal clips 23 each carrying a stationary contact 24 at a distance above the terminal head, while each of the rivets 20 at the opposite end of the terminal head provides for securement of one end of a flexible movable contactor blade 25 to the terminal head. These contactors 25 extend lengthwise of the terminal head, substantially parallel to the flanges 13 and 14 of the base of the bracket, and the free end of each lies beneath and is cooperable with one of the stationary contacts 24 on the contact clips 23. The contactors are preferably biased upwardly to carry contact points 26 on their free extremities into engagement with the stationary contacts 24 except when cammed downwardly away from the stationary contacts in consequence of rotation of the outer shaft 9.

The operating shaft assembly, which comprises the outer and inner shafts 9 and 10, respectively, is rotatably carried by the mounting bracket in bearings 29 and 30 formed in the front and rear flanges 13 and 14, respectively. These bearings support the two shafts for rotation on a common axis substantially normal to the flanges 13 and 14 and spaced a distance above the plane of the base of the bracket sufficient to accommodate the temperature selection switch 5 beneath the operating shaft assembly.

The outer shaft 9, of course, is of tubular construction, and has an inner section 31 comprising the rotor of the temperature selecting switch, and a coaxial front section 32, or driver, slightly smaller in diameter than the rotor. The inner section or rotor 31 is shown as comprised of insulating material, and it has a length such as to closely fit between the front and rear flanges 13 and 14 of the mounting bracket. A non-circular counterbore 34 in the front end portion of the rotor sleeve 31 receives the rear end of the driver 32 which, of course, has a non-circular shape corresponding to that of the counterbore 34 so as to provide a rotation transmitting connection between the driver and the rotor. The forward sleeve or driver 32 may conveniently be made of metal, and it passes forwardly through the front flange 13 to be rotatably accommodated in the bearing 29 thereof, to have its forward extremity accessible for manual actuation as by a knob or the like (not shown).

The inner shaft 10 which is rotatable inside the outer shaft, projects through both flanges 13 and 14 of the mounting bracket. Its forward extremity extends slightly beyond that of the outer shaft to be accessible for manual actuation, while its rear extremity projects a distance beyond the rear flange 14 to overlie the aperture 15 in the intermediate portion of the base of the mounting bracket. The bearing 30 in the rear flange 14, of course, rotatably receives the rear end portion of the inner shaft.

At its rear extremity the inner shaft has a disc-like cam 36 fixed thereto to provide for adjustment of a part on the water level control instrumentality, the adjustable part in this case being the stationary contact 37 of a pressure-sensitive water level control device 6. The water level control device 6 may conveniently be attached to the underside of the rear portion of the mounting bracket as by screws 38 passing through portions of the bracket and threading into suitably tapped holes (not shown) in the device 6.

Figure 2:
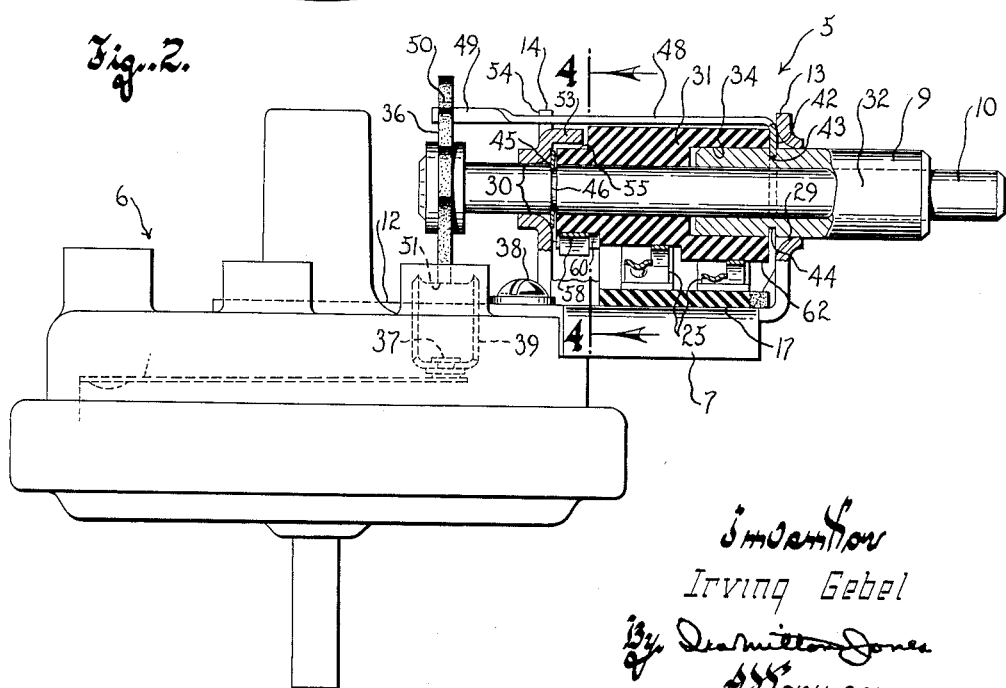
Figure 2 is a side elevational view of the fill control unit shown in Figure 1 but with portions thereof broken away and shown in section.

As shown best in Figures 1 and 2, therefore, the mounting bracket provides a convenient support for both the temperature selecting switch 5 and the pressure sensitive water level control device 6. While it forms no part of this invention, it should be noted that the stationary contact 37 of the pressure sensitive water level control device 6 is carried by a cantilever arm 39, intermediate the ends of the arm, and that the free end portion of the arm projects through an opening 40 in the top of the housing for the device 6 and into the aperture 15 in the mounting bracket so that the underside of the cam 36 can engage the arm and effect up and down adjustment thereof in consequence of rotation of the inner shaft 10.

While the insulating sleeve or rotor 31 is held against axial motion relative to the mounting bracket by its confinement between the flanges 13 and 14 of the bracket, it is necessary to provide a retainer for the outer section or driver 32 of the shaft 9. In the present case this retaining means comprises a plate-like retaining element 42 fixed to the front flange 13, flatwise overlying the inner face thereof, and having a notch 43 opening to its lower edge and of a size to fit in an annular groove 44 in the exterior of the driver 32 to lock the same against endwise motion along the inner shaft 10. The inner shaft 10 may be conveniently held against axial motion relative to the bracket by a bifurcated retaining plate 45 confined between the rear flange 14 and the adjacent rear end of the rotor 31, with the legs of the plate straddling the shaft 10 and engaging in an annular groove 46 therein.

The retaining plate 42 may be secured to the flange 13 of the mounting bracket as by rivets 47 or their equivalent during assembly of the shafts with the bracket, and comprises the base of an indexing finger 48 which projects rearwardly over the top of the rotor 31 beyond the rear flange 14 to have its rear extremity 49 engageable in any one of three different notches 50 in the periphery of the cam 36. The indexing finger 48 is flexible up and down, toward and from the periphery of the cam but is biased toward engagement therewith. Consequently the rear extremity of the finger and the notches in the cam provide detent type indexing means to define three different positions of rotation of the inner shaft 10, and consequently three different positions of adjustment of the arm carrying the stationary contact 37 of the pressure sensitive water level control instrumentality 6.

Each of the notches 50, of course, is formed on the periphery of the cam 36 at a location diametrically opposite one of the lobes 51 of the cam, it being understood that these lobes project slightly different radial distances from the axis of the shaft 10. During rotation of the inner shaft 10 to effect an adjustment of the position of the stationary contact 37, the indexing finger 48 is cammed upwardly to snap into the next adjacent notch 50, but it will be noted that peripheral portions of the cam are extended as at 52 at the outer sides of the two remote notches 50 so that the engagement of the extremity of the indexing finger in these remote notches precludes all but retrograde rotation of the inner shaft.

It is also important to note that the upper edge portion of the rear flange 14 directly beneath the indexing finger is bent forwardly to define a tab 53, leaving a notch 54 through which the indexing arm 48 passes to be steadied thereby against sidewise deflection in the event it is attempted to forcibly rotate the inner shaft beyond either limit of rotation thereof. The bent down tab 53 projects into an arcuate recess 55 in the adjacent end portion of the rotor to have engagement with circumferentially spaced abutments 56 at the ends of the recess to thus limit rotation of the outer shaft.

The indexing mechanism for the inner shaft, together with the means for limiting rotation of the outer shaft, comprises the subject matter of the copending application of Irving Gebel, Serial No. 487,880, filed February 14, 1955.

There are three different positions of rotation of the outer shaft 9 at which one or the other or both of the contactors 25 of the temperature selecting switch 5 are moved into engagement with their cooperating stationary contacts 24. Each of these three positions is defined by the engagement of a nose 58 on the medial portion of a resilient detent blade 59 on the mounting bracket in one of three circumferentially equi-spaced notches 60 in the exterior of the rotor 31 at the portion thereof substantially diametrically opposite the recess 55 therein.

With the nose 58 engaged in one of the notches, as shown, one of the contactors 25 is engaged with its cooperating stationary contact 24, and the other contactor 25 is held separated from its cooperating stationary contact by means of one of a number of cam projections 62 on the exterior of the rotor. In another position of rotation of the outer shaft defined by the engagement of the nose 58 in a second notch 60 of the rotor, the positions of the two contactors with respect to their stationary contacts may be reversed due to the positioning of the cam projections 62 on the rotor; and in the third position of the outer shaft both contactors 25 may be engaged with their cooperating stationary contact.

Consequently it will be seen that the rotor 31 has switch actuating means thereon in the form of a plurality of cam projections 62 and depressions intermediate the projections for effecting motion of the two switch contactors 25 to and from their switch on and switch off positions in consequence of rotation of the outer shaft to any one of the three defined positions thereof.

The indexing blade 59 for the outer shaft comprises a length of resilient spring metal having reduced end portions 64 received in notches 65 formed in the upper edges of upstanding tabs 66 struck from the base 12 of the mounting bracket near the ends of the insulating terminal head 17. By this means, the indexing blade is held crosswise of and beneath the rotor of the outer shaft, and spaced a distance above the upper face of the base of the bracket a distance such as to accommodate downward flexure of the blade during rotation of the outer shaft from one position to another.

The front flange 13 is preferably provided with a pair of tapped mounting holes 71, one at each side of the axis of the operating shaft assembly to enable the bracket, with both the temperature selecting and level controlling devices mounted thereon, to be attached to a panel of a washing machine. It is understood, of course, that the forward extremities of both shafts will project through an aperture in the panel so as to be accessible for manual actuation from the exterior of the machine. Knobs (not shown) may be attached to the forward extremity of each shaft to facilitate rotation thereof.

From the foregoing description taken together with the accompanying drawings it will be readily apparent to those skilled in the art that this invention provides a unitary fill control instrumentality for automatic washing machines and the like featuring compactness and ease of adjustment for the selection of the desired level and temperature of the water used to fill the machine.

What I claim as my invention is:

1. A control unit of the character described, comprising: a mounting bracket having a flat base and a channel-shaped portion thereon providing spaced apart front and rear flanges projecting upwardly from the base; an operating shaft assembly rotatably supported by said flanges at a location above said base and including a sleeve-like outer shaft having an inner portion confined between the flanges and a reduced outer portion projecting forwardly through the front flange to be accessible for manual actuation, and an inner shaft inside and coaxial with the outer shaft and having its rear portion projecting rearwardly beyond the rear flange and its front end portion terminating adjacent to the front portion of the outer shaft and accessible for manual actuation from a location ahead of the front flange; a pair of switches mounted on the bracket between said flanges and each having a movable contactor extending crosswise of the operating shaft axis and alongside the exterior of the outer shaft; actuating means on the exterior of said outer shaft cooperable with said contactors to effect motion thereof to and from switch closing positions in consequence of rotation of the outer shaft; a cam on the projecting rear portion of the inner shaft, behind the rear flange, for adjusting an element of an associated instrumentality adjacent to the mounting bracket; cooperating detent means on the outer shaft and the base of the bracket to define the different switch on and off positions of said contactors; and other cooperating detent means on the inner shaft and the mounting bracket defining different positions of rotation of the innner shaft and the cam thereon, said other detent means comprising a plurality of notches in the periphery of said cam, and an arm carried by the flange remote from said cam and having a resilient portion extending rearwardly over the outer shaft from said remote flange and engageable in any one of the notches of the cam.

2. A control unit of the character described, comprising: a mounting bracket having a channel shaped portion providing spaced apart front and rear flanges; a shaft projecting through both of said flanges and rotatably supported thereby; a sleeve of insulative material confined lengthwise between said flanges, said sleeve encircling the portion of said shaft lying between the flanges and being supported on the shaft for rotation relative thereto but coaxially thereof, said sleeve having a noncircular bore in the front portion thereof adjacent to the front flange; a driver for rotating said sleeve, said driver encircling the shaft and projecting forwardly through the front flange to have its front portion accessible for manual actuation from a location ahead of the front flange and having a noncircular portion received in and fitting said noncircular bore in the front portion of the sleeve to provide a rotation transmitting connection between the driver and said sleeve; a switch mounted on the bracket between the flanges thereof and including a movable contactor; actuating means on the exterior of said sleeve for effecting motion of the switch contactor between switch on and switch off positions in consequence of rotation of the sleeve by its driver; and a cam on the projecting rear end of the shaft, behind the rear flange, for adjusting an element of an associated instrumentality adjacent to the mounting bracket.

3. A control unit of the character described comprising: a mounting bracket having a channel-shaped portion providing spaced apart front and rear flanges; means on said flanges defining coaxial bearings; an operating shaft assembly rotatably journaled in sadi bearings and including a tubular outer shaft and a coaxial inner shaft rotatable inside the outer shaft, one end of the inner shaft projecting rearwardly beyond the adjacent end of the outer shaft and terminating behind the rear flange, and the other ends of said shafts projecting forwardly through the front flange so as to be accessible for independent manual actuation from a location ahead of the front flange; a cam fixed to the rear extremity of the inner shaft, behind the rear flange, said cam having a plurality of notches in the peripheral portion thereof remote from the plane of the web of the channel-shaped portion and the opposite peripheral portion of said cam having lobes thereon engageable with an element of an associated instrumentality adjacent to the mounting bracket to effect adjustment of the position of said element in consequence of rotation of the inner shaft; an indexing blade having a base portion fixed to one face of the front flange and having a resilient arm extending rearwardly over the rear flange with the extremity of said arm engageable in any one of the notches of said cam to yieldingly restrain the inner shaft against rotation and to define the different operating positions of the cam; the outer shaft having an annular groove in its exterior adjacent to said face of the front flange, and the base portion of the indexing blade projecting into said groove to lock the outer shaft against endwise motion relative to the mounting bracket; a switch mounted on the bracket between the flanges thereof and including a plurality of movable contactor blades extending crosswise of the axis of the shaft assembly alongside the exterior of the outer shaft; and switch actuating means on the exterior of the outer shaft transiently engageable with said contactor blades to effect motion thereof between switch on and switch off positions in consequence of rotation of the outer shaft.

4. The control unit set forth in claim 3 wherein said outer shaft comprises a sleeve of insulating material confined lengthwise between the flanges of the mounting bracket, and a tubular driver encircling the inner shaft and non-rotatably connected with the front end portion of said sleeve, said driver projecting forwardly through the front flange and having said annular groove in its exterior adjacent to the inner face of the front flange; and wherein the base portion of the indexing blade flatwise overlies the rear face of the front flange and enters the groove in the driver to hold the latter against axial displacement relative to the bracket.

5. The control unit set forth in claim 4 wherein the inner shaft has an annular groove in its exterior adjacent to the inner face of the rear flange, and wherein a relatively flat retaining element confined between the rear of said sleeve and the inner face of the rear flange engages in the annular groove of the inner shaft to lock the latter against axial motion relative to the mounting bracket.

6. The control unit set forth in claim 5 further characterized by the provision of a resilient detent blade carried by the mounting bracket adjacent to the rear flange and extending crosswise of the axis of the shaft assembly; and cooperating detent defining elements on said blade and on the exterior portion of the sleeve adjacent thereto for defining the different switch actuating positions of the sleeve.

7. A control unit of the character described, comprising; a mounting bracket having a channel-shaped portion providing spaced apart front and rear flanges substantially parallel to one another; an operating shaft assembly rotatably journaled in said flanges and including a tubular outer shaft, and a coaxial inner shaft rotatable inside the outer shaft, the front ends of both shafts projecting forwardly through the front flange to be accessible for manual actuation from a location ahead of the front flange, the inner shaft projecting rearwardly through the rear flange, and the rear flange overlying the rear extremity of the outer shaft to block rearward motion of the outer shaft relative to the mounting bracket; retaining means for precluding forward motion of the outer shaft relative to the mounting bracket, including a retaining plate overlying one flat face of the front flange and engaged in a groove in the exterior of the outer shaft; retaining means for precluding axial motion of the inner shaft relative to the mounting bracket, including another retaining plate flatwise interposed between the front face of the rear flange and the adjacent extremity of the outer shaft, and engaged in a groove in the exterior of the inner shaft; means securing one of said retaining plates to the flange adjacent thereto; a switch device mounted on the bracket between the flanges thereof and having contactor means movable between switch on and switch off positions; switch actuating means on the exterior of the outer shaft cooperable with said contactor means to effect motion thereof between switch on and switch off positions in consequence of rotation of the outer shaft; a cam on the rear extremity of the inner shaft to be rotated thereby; cooperating indexing means on the outer shaft and the mounting bracket for defining the switch on and switch off positions of the outer shaft; and cooperating indexing means on said cam and the mounting bracket for defining a plurality of different positions of rotation of the cam, said last named indexing means including a resilient finger on said secured retaining plate extending rearwardly therefrom beyond the rear flange of the mounting bracket and engageable in any one of a number of notches in the periphery of said cam.

8. A control unit for use with a washing machine of the type having automatic fill controlling instrumentalities for predetermining and preselecting the level and temperature of the water used to fill the machine and including a water level controlling device having an element which is adjustable to effect filling of the machine with water to different predetermined levels, and a water temperature controlling device having a pair of movable elements shiftable from one position to another to effect variation in the temperature of the water supplied to the machine to fill the same, said control unit comprising: a common mounting bracket for said controlling devices, said bracket having a relatively flat base, an attaching flange on the front end of the base for attaching the bracket to a panel of the machine, a second flange on an intermediate portion of the base located opposite the attaching flange and in spaced parallel relationship thereto, and means on said flanges defining bearings located on a common axis perpendicular to the flanges, the other end portion of the base having an opening therein adjacent to said second flange; an operating shaft assembly rotatably supported in said bearings and including a tubular outer shaft and a coaxial inner shaft rotatable inside the outer shaft, one end of the inner shaft projecting rearwardly beyond the adjacent end of the outer shaft and overlying said opening in the base; means on said other end portion of the base providing for mounting a water level controlling device thereon with its adjustable element accessible through said opening in the base; a cam on said projecting end of the inner shaft overlying said opening in the base and engageable with the adjustable element of a water level controlling device in position on the base to effect adjustment of the position of said element in consequence of rotation of the inner shaft; means on the front end portion of the base providing for mounting a temperature controlling device thereon with its movable elements extending between the exterior of the tubular outer shaft and the base; and actuating means on said outer shaft rotatable therewith for effecting shifting of the movable elements of a temperature controlling device in position on the base from one position to another.

References Cited in the file of this patent

UNITED STATES PATENTS

| 843,902 | Lewis | Feb. 12, 1907 |
| 2,307,946 | Parker | Jan. 12, 1943 |
| 2,319,503 | Glogau | May 18, 1943 |
| 2,642,503 | Dietrich | June 16, 1953 |
| 2,658,962 | Bourne | Nov. 10, 1953 |
| 2,669,616 | Frank | Feb. 16, 1954 |